(12) United States Patent
Sauerlaender

(10) Patent No.: US 9,041,306 B2
(45) Date of Patent: May 26, 2015

(54) DIMMABLE LIGHT SOURCE WITH TEMPERATURE SHIFT

(75) Inventor: Georg Sauerlaender, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 854 days.

(21) Appl. No.: 13/202,106

(22) PCT Filed: Feb. 15, 2010

(86) PCT No.: PCT/IB2010/050663
§ 371 (c)(1),
(2), (4) Date: Aug. 18, 2011

(87) PCT Pub. No.: WO2010/095084
PCT Pub. Date: Aug. 26, 2010

(65) Prior Publication Data
US 2011/0298381 A1    Dec. 8, 2011

(30) Foreign Application Priority Data

Feb. 20, 2009   (EP) ..................................... 09153274

(51) Int. Cl.
*H05B 41/16*    (2006.01)
*H05B 33/08*    (2006.01)

(52) U.S. Cl.
CPC ........ *H05B 33/0812* (2013.01); *H05B 33/0857* (2013.01); *Y02B 20/343* (2013.01); *Y10S 362/80* (2013.01)

(58) Field of Classification Search
CPC ........... H05B 33/0809; H05B 33/0821; H05B 33/0824; H05B 33/0803; H05B 33/0857; H05B 33/0806; H05B 33/0815; H05B 33/083; H05B 37/02; H05B 33/02; H05B 33/0818; H05B 33/0812; H05B 33/0848; H05B 33/086
USPC ............. 315/185 R, 250, 291, 192, 201, 312, 315/185 S, 186, 326, 113, 122, 153, 187, 315/200 A, 200 R, 209 R, 224, 227 R, 251, 315/294, 297, 323, 85, 86; 362/183, 20, 362/227, 234, 249.05, 249.13, 249.16, 276, 362/800, 812, 85, 86, 95; 257/E27.121, 88
See application file for complete search history.

(56) References Cited

U.S. PATENT DOCUMENTS

| 4,211,955 | A | * | 7/1980 | Ray ................................. 315/53 |
| 2004/0105264 | A1 | | 6/2004 | Spero |

(Continued)

FOREIGN PATENT DOCUMENTS

| DE | 10103422 A1 | 8/2002 |
| JP | 2007103371 A | 4/2007 |
| JP | 2009010099 A | 6/2007 |
| WO | 2007019663 A1 | 2/2007 |
| WO | 2008059033 A2 | 5/2008 |
| WO | 2008157391 A1 | 12/2008 |

OTHER PUBLICATIONS

National Semiconductor "LM431 Adjustable Precision Zener Shunt Regulator", Nov. 2000.*
National Semiconductor, "LM431 Adjustable Precision Zener Shunt Regulator", Nov. 2000.*

*Primary Examiner* — Douglas W Owens
*Assistant Examiner* — Borna Alaeddini
(74) *Attorney, Agent, or Firm* — Yuliya Mathis

(57) ABSTRACT

An illumination device (1) comprises:
  input terminals (2) for coupling to AC mains;
  a LED string (10) connected in series with the input terminals;
  a rectifier (30), having input terminals connected in series with the LED string;
  a controllable voltage source (40), having input terminals coupled to the rectifier output terminals;
  a series arrangement of at least one auxiliary LED (51) and a second ballast resistor (52) connected to the output terminals of the controllable voltage source.
The voltage source comprises:
  a series arrangement of an adjustable first resistor (46) and a second resistor (47) connected in parallel to the input terminals;
  a tuneable Zener diode (49) connected in parallel to the output terminals, having a control input terminal (48) connected to the node between the two resistors; wherein positive output terminal is connected to positive input terminal and negative output terminal is connected to negative input terminal.

20 Claims, 2 Drawing Sheets

(56) References Cited

U.S. PATENT DOCUMENTS

| | | |
|---|---|---|
| 2006/0138971 A1 | 6/2006 | Uang et al. |
| 2006/0151830 A1 | 7/2006 | Gonzalez |
| 2006/0202915 A1 | 9/2006 | Chikugawa |
| 2007/0076426 A1* | 4/2007 | Kling et al. .................. 362/555 |
| 2007/0109827 A1* | 5/2007 | DelaCruz ..................... 363/131 |
| 2008/0116816 A1 | 5/2008 | Neuman et al. |
| 2008/0211421 A1* | 9/2008 | Lee et al. ...................... 315/250 |
| 2008/0258643 A1* | 10/2008 | Cheng et al. ................. 315/246 |

* cited by examiner

DIMMABLE LIGHT SOURCE WITH TEMPERATURE SHIFT

FIELD OF THE INVENTION

The present invention relates in general to an illumination device comprising LEDs as light sources.

BACKGROUND OF THE INVENTION

The use of LEDs as light source for illumination rather than mere indicator lights is well known, since the development of high-power LEDs. It is also rather standard that an illumination device is powered from mains, typically 230 V @50 Hz in Europe. Since LEDs require a relatively low voltage (typically in the order of 3 V) and allow current flow in one direction only, driver circuits have been developed for generating a DC LED current on the basis of the AC mains. However, such driver circuits are relatively expensive.

In a more simple approach, a string of LEDs is connected to mains directly, in series with a ballast resistor. For allowing LED current and thus light output in both halves of the AC period, two such strings are connected anti-parallel. The idea would be that, for instance, 70 LEDs would accommodate a voltage drop of 210 V, while the remaining 20 V would be accommodated by the ballast resistor. Voltage variations would be taken up by the ballast resistor.

Although the simplicity of this approach, and hence the relatively cheap implementation thereof, has a certain attractiveness, there is a problem when it is desired that the illumination device is dimmed.

For certain applications, it is not only desired that the illumination device is dimmable, but also that the colour temperature of the output light is shifted to a lower value on dimming. This requirement is specifically important in the case of small bedside lamps or reading lamps, but it may be that there are other applications where the same feature would be desirable.

SUMMARY OF THE INVENTION

An object of the present invention is to provide a simple and cost-efficient illumination device having a plurality of LEDs as light sources, capable of being dimmed in a simple manner while simultaneously the light output of the device shifts to a lower colour temperature automatically.

According to an important aspect of the present invention, a tunable voltage source is connected in series with at least one white LED, this voltage source powering at least one red LED. When the output power of the voltage source is increased, the voltage drop over the voltage source is increased so that the white LED receives less power while the red LED receives more power.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
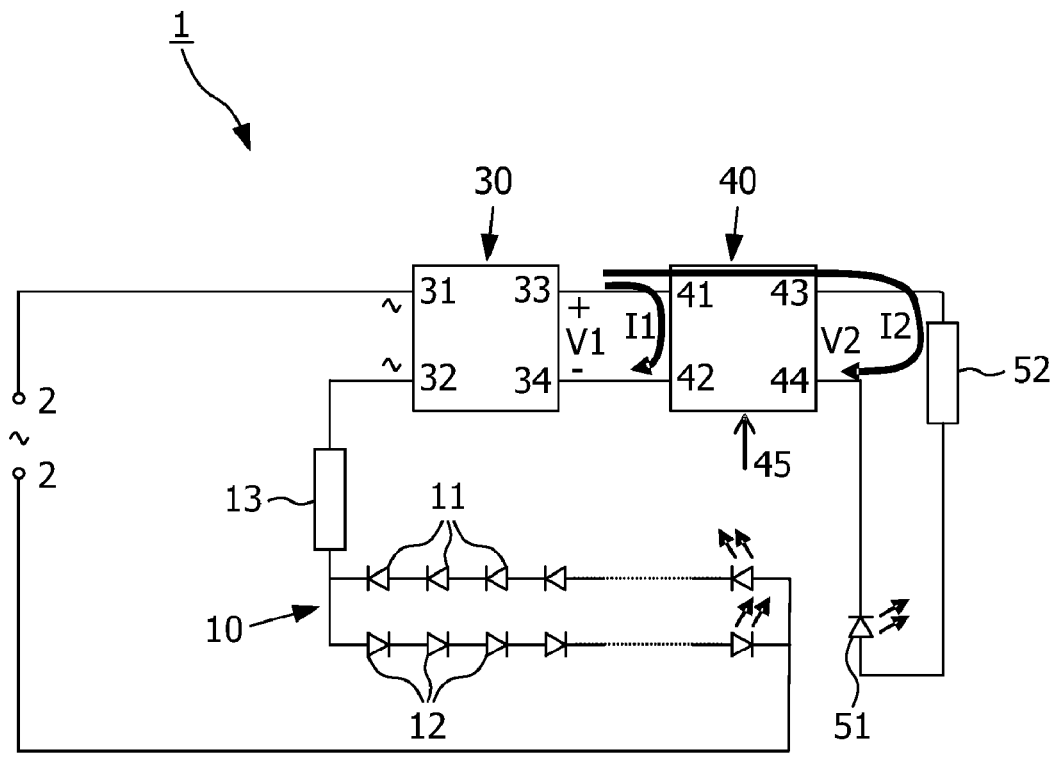
FIG. 1 schematically shows a block diagram of an illumination device.

FIG. 1 schematically shows a block diagram of an illumination device 1 according to the present invention. The illumination device 1 comprises input terminals 2 for coupling to AC mains. A LED string 10 is connected in series with the input terminals 2. The LED string 10 comprises a first series of primary power LEDs 11 and a second series of primary power LEDs 12 connected anti-parallel to the first series. A first ballast resistor 13 is connected in series with the LED string 10.

The primary LEDs 11, 12 are preferably white LEDs. However, it is also possible that one or more of these LEDs are coloured LEDs.

A rectifier 30 has its input terminals 31, 32 mounted in series with the LED string 10. The rectifier 30 may suitably comprise a bridge circuit of diodes, as commonly known.

At its output terminals 33, 34, the rectifier 30 provides a rectified DC voltage V1. If required, this voltage may be smoothed by a capacitor in parallel to the output terminals 33, 34, but this is not shown for sake of simplicity.

The illumination device 1 further comprises a controllable voltage source 40, having input terminals 41, 42 coupled to the rectifier output terminals 33, 34 to receive the rectified DC voltage V1 as input voltage. Reference numeral 45 indicates a user-controllable control input. At its output terminals 43, 44, the controllable voltage source 40 provides a DC output voltage V2, of which the magnitude depends on the input received at the user control input 45. A series arrangement of at least one auxiliary LED 51 and a second ballast resistor 52 is connected to the output terminals 43, 44 of the controllable voltage source 40.

Normally, only one auxiliary LED 51 will be sufficient, but the gist of the present invention is also applicable if two or more auxiliary LEDs are connected in series.

Preferably, the auxiliary LED 51 is a red power LED. However, the gist of the present invention is also applicable if the colour of the auxiliary LED 51 has a lower colour temperature than the colour of the primary power LEDs 11, 12. For instance, an embodiment would be possible where the primary power LEDs 11, 12 are white LEDs while the auxiliary LED 51 is an orange or yellow LED. Further, in the case of multiple auxiliary LEDs, it is not essential that all auxiliary LEDs mutually have the same colour.

It is noted that, in stead of a controllable voltage source 40, a controllable current source can be used.

Figure 3:
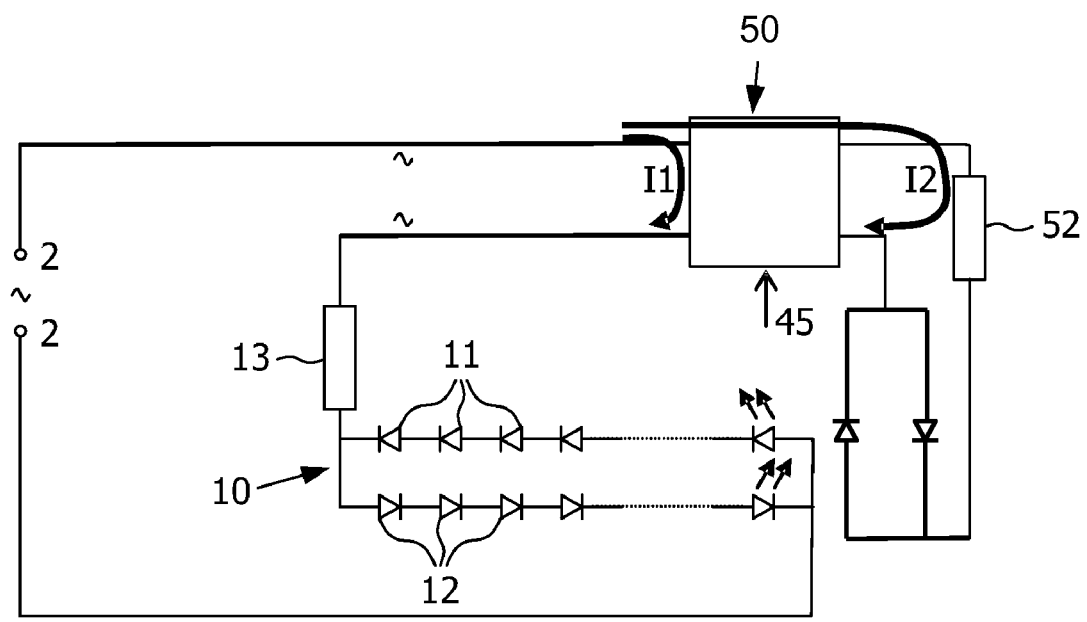
FIG. 3 schematically shows a block diagram of another illumination device.

It is further noted that, instead of a controllable DC voltage (or current) source, a controllable AC voltage (or current) source 50 (see FIG. 3) can be used. In that case, the rectifier 30 can be omitted, and the auxiliary LEDs may comprise at least two LEDs mounted anti-parallel.

The primary LEDs 11, 12 and the auxiliary LED(s) 51 are mounted close together in the illumination device 1, so that the overall output light as produced by the illumination device 1 as a whole, as perceived by a user, is a mixture of the individual light outputs of the individual LEDs 11, 12, 51.

The current provided by the mains and received by the LED string 10 will be indicated as Imains. This current is also received as input current by the rectifier 30. It is assumed that no current is lost in the rectifier 30. The rectified mains current (output current of the rectifier 30), which will be indicated as <Imains>, is provided as input current to the voltage source 40. Part of the rectified mains current will be consumed by the controllable voltage source 40: this current will be indicated as ballast current I1. The current produced at the output of the voltage source 40 and received by the auxiliary LED 51 will be indicated as auxiliary current I2. Thus, it should be clear that <Imains>=I1+I2.

The operation is as follows. Assume that the user has set the controllable DC voltage source 40 to a low output voltage, so that the auxiliary LED 51 does produce no light or only a small amount of light. Then, the voltage drop over the input terminals 41, 42 of the voltage source 40 is relatively low, and consequently the voltage drop over the input terminals 31, 32 of the rectifier 30 is low, so the LED string 10 receives the maximum drive voltage and produces maximum light output.

Assume that the user is adjusting the controllable DC voltage source 40 to a higher output voltage. As a consequence, the auxiliary LED 51 produces an increased amount of light. Simultaneously, the voltage drop over the input terminals 41, 42 of the voltage source 40 is increasing and hence the voltage drop over the input terminals 31, 32 of the rectifier 30 is increasing, the drive voltage for the LED string 10 is decreasing and the amount of light produced by the LED string 10 is decreasing. All in all, the light output level of the illumination device is reduced (dimmed), while the relative content of red light in the output light is increased (shift to lower colour temperature).

Figure 2:
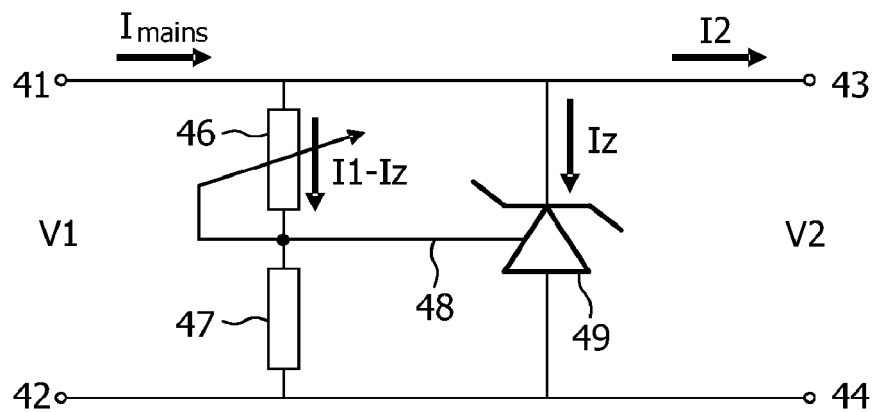
FIG. 2 schematically shows a block diagram of a voltage source for use in the illumination device of FIG. 1.

FIG. 2 is a block diagram of an embodiment of the voltage source 40 which is preferred because of its simplicity. A tuneable Zener diode 49 (for instance the standard component TL431 or LM431, commercially available from, for instance, Motorola, Texas Instruments, Fairchild Semiconductor) is connected in parallel to the output terminals 43, 44. A series arrangement of a first resistor 46 and a second resistor 47 is connected in parallel to the input terminals 41, 42. The node between the two resistors 46, 47 is connected to a control input terminal 48 of the tuneable Zener diode 49. The positive output terminal 43 is connected to the positive input terminal 41, and the negative output terminal 44 is connected to the negative input terminal 42. One of the said resistors 46, 47 is an adjustable resistor and implements the user control input 45; in the embodiment as shown, this applies to the first resistor 46 connected to the positive input terminal 41.

With the circuit of FIG. 2, the output voltage V2 meets the formula $V2=(1+R1/R2)\cdot Vref$, wherein R1 is the resistance value of the first resistor 46;
R2 is the resistance value of the second resistor 47;
Vref is an internal reference voltage of the tuneable Zener diode 49, typically about 1.2 V or 2.5 V.

It is noted that in this circuit V1=V2.

If R1=0, the output voltage V2 will be equal to Vref, too low for the auxiliary LED 51 to draw a current (depending on the properties of the auxiliary LED 51 and second ballast resistor 52). Since also the input voltage V1 will be equal to Vref, the LED string 10 receives almost the full mains voltage. The resulting large main current <Imains> will flow mainly through the Zener 49 and partly through the second resistor 47.

If R1 is increased, the output voltage V2 will increase, so that the auxiliary LED 51 can draw more current I2 (the precise amount of auxiliary current I2 will depend on the properties of the auxiliary LED 51 and second ballast resistor 52). Since also the input voltage V1 increases, the LED string 10 receives less voltage and will thus draw less main current Imain. The difference I1=<Imains>−I2 will flow mainly through the Zener 49, indicated as Iz, and partly through the first and second resistors 46, 47. As should be clear to a person skilled in the art, a proper dimensioning of the components, particularly the first and second ballast resistors 13, 52 and the forward voltages of the LEDs 11, 12, 51, in conjunction with the number of LEDs and their light output, will result in the desired colour shift while dimming Summarizing, the present invention provides an illumination device 1 comprising:
input terminals 2 for coupling to AC mains;
a LED string 10 connected in series with the input terminals;
a rectifier 30, having input terminals connected in series with the LED string;
a controllable voltage source 40, having input terminals coupled to the rectifier output terminals;
a series arrangement of at least one auxiliary LED 51 and a second ballast resistor 52 connected to the output terminals of the controllable voltage source.

The voltage source comprises:
a series arrangement of an adjustable first resistor 46 and a second resistor 47 connected in parallel to the input terminals;
a tuneable Zener diode 49 connected in parallel to the output terminals, having a control input terminal 48 connected to the node between the two resistors.

The positive output terminal is connected to the positive input terminal and the negative output terminal is connected to the negative input terminal While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims. For instance, the first ballast resistor 13 may be displaced toward the rectifier 30 or the source 40.

Further, the LED string 10 may have a configuration differing from the configuration shown in FIG. 1. For example, the LED string may be implemented as a series arrangement of LED units, wherein each LED unit comprises at least one first LED connected anti-parallel to at least one second LED. Other ladder configurations are conceivable, too.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An illumination device, comprising:
input terminals of the illumination device for coupling to AC mains;
a light emitting diode (LED) string connected in series with the input terminals of the illumination device;
a rectifier, having input terminals which are connected in series with the LED string and the input terminals of the illumination device, and having output terminals;

a controllable voltage source, having input terminals coupled to the rectifier output terminals, and having output terminals; and a series arrangement of at least one auxiliary LED and an auxiliary ballast resistor connected across the output terminals of the controllable voltage source.

2. The illumination device of claim 1, further comprising a primary ballast resistor connected in series with the LED string and the input terminals of the rectifier.

3. The illumination device of claim 1, wherein at least some LEDs in the LED string are white LEDs.

4. The illumination device of claim 1, wherein the auxiliary LED comprises a red LED.

5. The illumination device claim 1, wherein the correlated color temperature of the output light of the auxiliary LED is lower than the correlated color temperature of the output light of the LED string.

6. The illumination device of claim 1, wherein the output terminals of the rectifier include a positive output terminal and a negative output terminal, wherein the input terminals of the controllable voltage source include a positive input terminal and a negative input terminal, and wherein the controllable voltage source comprises:

a series arrangement of a first resistor and a second resistor connected across the input terminals of the voltage source;

a tunable Zener diode connected across the output terminals of the voltage source, the tunable Zener diode having a control input terminal connected to the node between the two resistors;

wherein the positive output terminal of the rectifier is connected to the positive input terminal of the controllable voltage source, and the negative output terminal of the rectifier is connected to the negative input terminal of the controllable voltage source; and wherein one of the said first and second resistors is an adjustable resistor.

7. The illumination device of claim 6, wherein the first resistor connected between the positive input terminal and the control input terminal of the tunable Zener diode is the adjustable resistor.

8. The illumination device of claim 1, the LED string comprising an anti-parallel arrangement of: a first series of primary power LEDs; and a second series of primary power LEDs connected anti-parallel to the first series.

9. The illumination device of claim 1, wherein the controllable voltage source is configured to supply an output voltage across the output terminals thereof and to apply the output voltage across the series arrangement of the at least one auxiliary LED and the auxiliary ballast resistor.

10. The illumination device of claim 1, further comprising a primary ballast resistor connected in series with: the input terminals of the rectifier, the input terminals of the illumination device, and the LED string.

11. The illumination device of claim 1, wherein the controllable voltage source includes an adjustable element configured to vary a ratio of: (1) a voltage across the output terminals of the rectifier, to (2) a voltage across the LED string.

12. An illumination device, comprising:
first and second input terminals of the illumination device for coupling to an AC voltage supply;
a rectifier having first and second input terminals and first and second output terminals;
a light emitting diode (LED) string comprising at least a first series of LEDs; and a controllable source being one of a controllable voltage source and a controllable current source, the controllable source having a pair of input terminals and a pair of output terminals, wherein the pair of input terminals of the controllable source is connected across the first and second output terminals of the rectifier; and a series arrangement of at least one auxiliary LED and an auxiliary ballast resistor, wherein a series circuit is connected across the input terminals of the illumination device, the series circuit comprising:
an input of the rectifier, the input of the rectifier being across the first and second input terminals of the rectifier, and
the LED string, and wherein the series arrangement of the at least one auxiliary LED and the auxiliary ballast resistor is connected across the pair of output terminals of the controllable source.

13. The illumination device of claim 12, wherein the series circuit further comprises a primary ballast resistor connected in series with: the input of the rectifier, and the LED string.

14. The illumination device of claim 13, wherein the first input terminal of the illumination device is directly connected to the first input terminal of the rectifier, and the second input terminal of the illumination device is directly connected to one of the primary ballast resistor and the LED string.

15. The illumination device of claim 13, wherein the first input terminal of the illumination device is directly connected to the primary ballast resistor, and the second input terminal of the illumination device is directly connected to the LED string.

16. The illumination device of claim 15, wherein the LED string comprises an anti-parallel arrangement of: a first series of primary power LEDs; and a second series of primary power LEDs connected anti-parallel to the first series, and wherein the first input terminal of the illumination device is directly connected to the primary ballast resistor, and the second input terminal of the illumination device is directly connected to the anti-parallel arrangement.

17. The illumination device of claim 12, wherein the controllable source includes an adjustable element configured to vary a ratio of: (1) a voltage across the output terminals of the rectifier, to (2) a voltage across the LED string.

18. An illumination device, comprising:
first and second input terminals of the illumination device for coupling to AC mains;
a light emitting diode (LED) string comprising at least a first series of LEDs; and
a controllable AC source being one of a controllable AC voltage source and a controllable AC current source, the controllable AC source having first and second input terminals and first and second output terminals; and
a series arrangement of at least one auxiliary LED and an auxiliary ballast resistor,
wherein a series circuit is connected across the input terminals of the illumination device, the series circuit comprising:
an input of the controllable AC source, the input of the controllable AC source being across the first and second input terminals of the controllable AC source, and
the LED string, and
wherein the series arrangement of the at least one auxiliary LED and the auxiliary ballast resistor is connected across the pair of output terminals of the controllable AC source.

19. The illumination device of claim 18, wherein the at least one auxiliary LED comprises at least two auxiliary LEDs connected anti-parallel to each other.

20. The illumination device of claim 18, wherein the series circuit further comprises a primary ballast resistor connected in series with the input of the controllable AC source and the LED string.

\* \* \* \* \*